United States Patent
Chu et al.

(10) Patent No.: US 6,703,077 B1
(45) Date of Patent: Mar. 9, 2004

(54) SUBCOAT FOR FIBER ADHESION

(75) Inventors: Judy Chu, Hudson, OH (US); James Gregory Gillick, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/110,366

(22) PCT Filed: Nov. 2, 1999

(86) PCT No.: PCT/US99/25788
§ 371 (c)(1),
(2), (4) Date: Apr. 9, 2002

(87) PCT Pub. No.: WO01/32752
PCT Pub. Date: May 10, 2001

(51) Int. Cl.$^7$ .................................................. B05D 3/02
(52) U.S. Cl. ................................ 427/389.9; 427/372.2; 427/375
(58) Field of Search ............................. 428/36.1, 295, 428/375, 378, 395, 492; 524/346, 555; 427/389.9, 372.2, 375, 379; 156/910; 585/15, 950; 166/310, 371; 137/3, 13

(56) References Cited

U.S. PATENT DOCUMENTS

| | | | | |
|---|---|---|---|---|
| 2,748,049 A | * | 5/1956 | Kalafus et al. ............. | 154/139 |
| 3,525,703 A | * | 8/1970 | Ichiro et al. ............... | 260/5 |
| 4,460,029 A | * | 7/1984 | Schuetz et al. ............. | 152/359 |
| 5,583,273 A | | 12/1996 | Colle et al. ................ | 585/15 |
| 5,922,797 A | * | 7/1999 | Chu et al. .................. | 524/346 |

FOREIGN PATENT DOCUMENTS

GB                  771628             4/1957        ......................... 2/5

OTHER PUBLICATIONS

Chemical Abstracts, vol. 121, No. 2, Jul. 11, 1994, Columbus, Ohio, U.S.; Abstract No. 11381, XP002140774 and JP 05 339552 A (Nippon Catalytic Chen Ind) Dec. 21, 1993.

* cited by examiner

*Primary Examiner*—Merrick Dixon
(74) *Attorney, Agent, or Firm*—John D. Delong; David E. Wheeler

(57) ABSTRACT

A process for adhering synthetic textile fibers to sulfur vulcanizable rubbers comprising the steps of (I) immersing the fibers in an aqueous solution which is comprised of (a) 1% to 4% by weight oxazoline polymer, (b) 0% to 4% alkylene glycol monoether and (c) 92% to 99% water to produce coated fibers; (II) drying the coated fibers to produce subcoated fibers; (III) subjecting the subcoated fibers to an RFL adhesive dip to produce dipped fibers; (IV) drying the dipped fibers to produce dried dipped fibers; (V) placing the dried dipped fibers in contact with a sulfur vulcanizable rubber; and (VI) curing the sulfur vulcanizable rubber while it is in contact with the dried dipped fibers. Also provided is a composite article made using the process.

6 Claims, No Drawings

SUBCOAT FOR FIBER ADHESION

FIELD OF THE INVENTION

This invention relates to adhesives and particularly to subcoats for bonding synthetic fibers, such as aramid, nylon and polyester fibers, to rubber. Such compositions may be used in manufacturing composite articles, for example tires, to bond reinforcement fibers to tire rubber compositions.

BACKGROUND OF THE INVENTION

In the manufacturing of rubber composites which include fiber reinforcement in the form of fibers, filaments or cords, close attention is given to the adhesion between the rubber matrix of the composite and the fibrous reinforcement.

Aramid fiber, for example, is a fiber used for tire reinforcement. Providing adhesion between aramid and rubber is very difficult due to the crystalline surface of the fiber. Hence a separate subcoat is necessary in order to form a reasonable bond between fiber and rubber. An epoxy adhesive subcoat followed with a resorcinol formaldehyde latex (RFL) dip provides good adhesion to sulfur cured rubber for aramid reinforcement.

U.S. Pat. No. 5,922,797, incorporated herein by reference, teaches the use of a latex adhesive for improving the adhesion between a rubber matrix and fibrous reinforcement.

U.S. Pat. No. 2,748,049 discloses an adhesive dip which is reported to strongly adhere to fabric and rubber, and which is further reported to be relatively flexible. This dip is made utilizing a latex of a copolymer of a conjugated diolefin monomer, such as butadiene, and an unsaturated aldehyde monomer, such as methacrolein.

In commercial practice, resorcinol-formaldehyde-latex (RFL) dips have been widely implemented by the tire industry for bonding synthetic fabrics to rubber. For instance, U.S. Pat. No. 3,525,703 discloses a water-based adhesive composition for bonding synthetic fiber material to rubber. The teachings of U.S. Pat. No. 3,525,703 specifically disclose the utilization of styrene-butadiene latex and vinylpyridine-styrene-butadiene latex in such water-based adhesive compositions.

U.S. Pat. No. 4,460,029, incorporated herein by reference, teaches the use of oxazoline polymerized in latex form for tire cord adhesion.

Nippon Shokubai Co., Ltd., has acquired U.S. Pat. No. 4,460,029, and has continued to develop oxazoline compositions. Product information on oxazolines has been published by Nippon Shokubai Co., Ltd., entitled "EPOCROS K-1000, K-2000 series", whereby such publication is also incorporated herein by reference.

Epoxy subcoat used currently demonstrates excellent adhesion with good rubber coverage in all compounds.

Due to environmental concerns regarding epoxy material, there is an interest in finding an alternative subcoat material, if substantially equivalent adhesion is maintained.

Also, oxazoline polymer is known to provide much longer pot life in adhesive formulations than epoxies.

SUMMARY OF THE INVENTION

A composition comprising 1% to 4% solids oxazoline polymer, 0% to 4% alkylene glycol monoether, and 92% to 99% water is provided, wherein all percentages are by weight.

In an alternative embodiment, the composition may comprise (1) oxazoline polymer and (2) a latex which is comprised of (a) water, (b) an emulsifier and (c) a polymer.

Also provided is a process for adhering synthetic textile fibers to sulfur vulcanizable rubbers comprising the steps of (I) immersing said fibers in an aqueous dispersion which is comprised of (a) 1% to 4% by weight oxazoline polymer, (b) 0% to 4% alkylene glycol monoether and (c) 92% to 99% water to produce coated fibers; (II) drying the coated fibers to produce subcoated fibers; (III) subjecting the subcoated fibers to an RFL adhesive dip to produce dipped fibers; (IV) drying the dipped fibers to produce dried dipped fibers; (V) placing the dried dipped fibers in contact with a sulfur vulcanizable rubber; and (VI) curing the sulfur vulcanizable rubber while it is in contact with the dried dipped fibers.

Also provided is a composite article of rubber and fibers, wherein the fibers have distributed over surface portions thereof (a) oxazoline polymer; (b) an RFL adhesive; and (c) an in situ vulcanized rubber compound.

The fibers in the composite article may comprise, for example, polyester fibers and aramid fibers.

In a preferred embodiment, the composite article is a tire.

DETAILED DESCRIPTION OF THE INVENTION

Schuetz et al., in U.S. Pat. No. 4,460,029 teach the use of oxazoline in a water insoluble latex adhesive for improving adhesion between fiber reinforcement (especially filaments and cords) and rubber. According to the present invention, the inventors have modified a water soluble oxazoline polymer solution (without latex) provided by Nippon Shokubai by diluting the solution with water to provide a solution with a polymer solids content of 1% to 4%, and have used the diluted solution directly on substrate fibers as a subcoat (in place of an epoxy subcoat), prior to a resorcinol aldehyde latex (RFL) dip, to improve adhesion between the fibers and a rubber matrix in a composite in which the fibers may be used.

In one embodiment, the oxazoline polymer solution contains an alkylene glycol monoether solvent (WS-500). For environmental reasons, it is preferred that the oxazoline polymer be prepared without solvent, although compositions made with or without glycol monoether solvent show desirable results in the invention.

The diluted oxazoline polymer, when used as a subcoat on fibers, provides good adhesion to the types of rubber compositions described in U.S. Pat. No. 4,460,029.

Oxazoline polymers, EPOCROS WS-500 and WS-700, developed by Nippon Shokubai Co., Ltd., are water-soluble polymers containing pendant oxazoline groups which are designed for use as a crosslinker for carboxylated waterborne polymers.

Oxazoline reacts with functional groups such as carboxyl, acid anhydride, phenolic hydroxyl and phenolic thiol. The reaction of an oxazoline group with a carboxylic group is very effective. It can react rapidly with carboxylic groups above temperatures of 80 to 100 degrees C to form an amide ester.

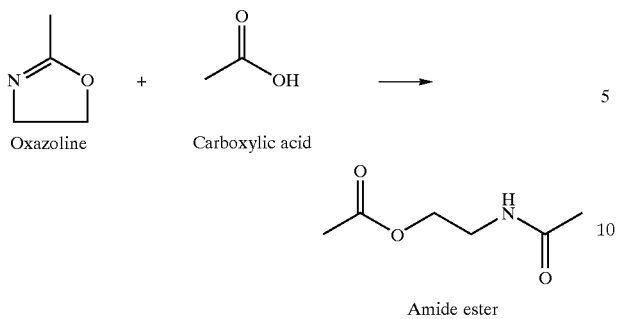

Because of its high reactivity, the inventors speculated that the oxazoline crosslinker may have potential for use in an adhesive system for rubber reinforcement materials.

Early tests of the material provided by Nippon Shokubai did not show good results, and showed different degrees of effectiveness on different materials. Since some tests showed an over stiffening of the fiber, the inventors further speculated that a reduction of the solids content of adhesive would improve the results.

Oxazoline polymer WS-500 has a composition (% by wt) of polymer/PM/water 40/38/22, where PM is propylene glycol monomethylether. Although the inventors dilute the polymer to much lower solid level for subcoat applications, the presence of organic solvent could still affect the environment. Based on this concern, the inventors suggested, and Nippon Shokubai made an effort to produce a new oxazoline polymer (WS-700) which is free of volatile organic chemicals (VOC). WS-700 has a solid level of 24.1%. The weight per oxazoline equivalent (WPO) of WS-700 is 220 (gram solid /equivalent), the same as in WS-500.

In accordance with this invention, the cord or fabric to be treated is dipped for 1 to 5 seconds in the oxazoline polymer solution of the invention, followed by dipping in an RFL latex adhesive, and dried at a temperature within the range of about 75° C. to about 265° C. for about 0.5 minutes to about 5 minutes, and thereafter calendered into rubber and cured therewith. The drying step utilized will preferably be carried out by passing the cord through 2 or more drying ovens which are maintained at progressively higher temperatures. For instance, it is highly preferred to dry the cord by passing it through a first drying oven which is maintained at a temperature of about 250° F. (121° C.) to about 300° F. (149° C.) and then to pass it through a second oven which is maintained at a temperature which is within the range of about 350° F. (177° C.) to about 500° F. (260° C.). It should be appreciated that these temperatures are oven temperatures rather than the temperature of the cord being dried. The cord will preferably have a total residence time in the drying ovens which is within the range of about 1 minute to about 3 minutes. For example, a residence time of 30 seconds to 90 seconds in the first oven, and 30 seconds to 90 seconds in the second oven, could be employed.

In testing, the oxazoline subcoat of the invention demonstrated adhesion comparable to the control when using an oxazoline solution having a solid content of 1% to 4% by weight. Some of the fibers tested appeared to be too stiff when the 4% solution was used, and slightly reduced adhesion was observed in some fibers when the 1% solution was used. The best overall results were achieved using a 2% oxazoline solution on a substrate, but it is believed that higher and lower concentrations will be useful in specific applications where stiffness is not a factor or in components where reduced adhesion is acceptable.

It was found that the diluted composition of the invention can be used in combination with a latex to show good adhesion, and such an oxazoline polymer/latex combination can especially be used with polyester cords to reduce stiffness.

As is known to those skilled in the art, latexes are made with an emulsifier, a polymer and water. It is believed that latex compositions described in the references herein can be used with the oxazoline polymer composition when used as a subcoat. Such latexes may be used in a solution having a solids content of 0.5% to 4%, preferably about 1% latex, together with 0.5% to 4% oxazoline polymer, where the total solids content is 1% to 6%, and all percentages are by weight. Preferred are latexes containing 1,3-butadiene, copolymers or terepolymers thereof with styrene and vinyl pyridine as the polymer component.

As used herein, "fibers" includes short fibers, as well as fiber cords and filaments. The fibers may comprise organic polymers known in the art, such as, but not limited to, polyamides, aromatic polyamides, polyesters, polyalchohols, polyalkylenes and polyethers, as well as inorganic fibers such as fiber glass and carbon fibers (e.g. graphite).

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

This example provides testing using polyester and aramid test samples to provide a preliminary understanding of the effect of using an oxazoline subcoat on fibers.

Control adhesive for polyester is a double coat of epoxy modified RFL adhesive (EMRFL). Polyester was also dipped with polyfunctional epoxy resin (EPR) subcoat and RFL topcoat for comparison. Experimental adhesive is WS-500 oxazoline polymer at 4% solid level as subcoat and RFL as topcoat.

Cord Processing:

The aramid and polyester cords were prepared by drying the first coat at 280° F. for 60 seconds and curing at 480° F. for 60 seconds; and drying the second coat at 280° F. for 60 seconds and curing at 480° for 60 seconds. The cords using the experimental subcoat/topcoat, were prepared using the same procedures.

Compounds for Testing:

Dipped aramid cords were tested in three compounds.

PTB (Passenger Tire Belt)

ATP (Radial Aircraft Tire Ply)

HPTB (High performance Tire Belt)

Dipped polyester cords were tested in Passenger and Light Truck Tire Compounds (PTP).

RESULTS AND DISCUSSIONS:

Evaluation of WS-500 oxazoline polymer was conducted for both aramid and polyester adhesives. Dipped cords were tested for static adhesion, and hot dynamic flex fatigue. Results are summarized in Table 1 and Table 2.

In this and the following examples, the static peel adhesion test refers to a test where fabric is embedded in rubber and the rubber is cured using a bladder. The composite samples are then subjected to load until the rubber separates from the fabric, and the force required to separate the fabric from the rubber is measured, usually in Newtons (N).

The hot dynamic flex test uses samples comprising two layers of tire cords or fabric cured into a rubber pad. The sample is cut in strips parallel to the cords. Some strips are flexed, and the fabric layers are separated from the rubber on a tensile tester, and dynamic adhesion values are measured. The break strength of the flexed and non-flexed cords are then measured.

PULL OUT adhesion refers to a modified I test (ASTM) where a sample cord is cured in a block of rubber, and the cord is pulled out of the rubber along its axis using an Instron test device. Pull out adhesion measures the energy, in Joules (J) required to debond a piece of dipped cord embedded and cured in a compound.

TABLE 1

WS-500 for Aramid Application
Cord: DuPont Aramid 1670 dTex/3, 6.9 × 6.9 tpi

| Test | EPR/RFL Control | WS-500/RFL Expt. |
|---|---|---|
| Static Adhesion, N (Test @ 250 F.) | | |
| PTB | 112 (3) | 121 (3) |
| ATP | 134 (4) | 125 (2) |
| HPTB | 100 (5) | 86 (2) |
| *Rubber coverage in parenthesis, evaluated on a scale of 1 to 5. | | |
| Dynamic Flex, 1" spindle, 170 F., 2.5 hr | | |
| PTB Adhesion, N | | |
| Unflexed | 111 | 111 |
| Flexed | 102 | 107 |
| % Ret. Tensile | 59 | 60 |
| ATP Adhesion, N | | |
| Unflexed | 135 | 127 |
| Flexed | 130 | 123 |
| % Ret. Tensile | 64 | 59 |
| HPTB Adhesion, N | | |
| Unflexed | 64 | 69 |
| Flexed | 59 | 64 |
| % Ret. Tensile | 58 | 63 |

For aramid application using 4% solids oxazoline, test results suggest that experimental cords give lower static adhesion in all three compounds, equal dynamic flex adhesion, and slightly lower retained tensile break strength.

TABLE 2

WS-500 for polyester Application
Cord: AlliedSignal    Control 1: EMRFL
polyester (1 × 30)    Control 2: EPR subcoat, RFL topcoat
1100 dtex/3, 8.5 × 8.5 tpi  Expt: WS-500 subcoat, RFL topcoat

| Test | EMRFL Control 1 | EPR/RFL Control 2 | WS-500/RFL Expt. |
|---|---|---|---|
| Static Adhesion, N (Test @ 250 F.) | | | |
| PTP, 6'/340° F. | 130 (5) | 163 (5) | 151 (5) |
| 13'/340° F. | 125 (5) | 106 (4) | 154 (5) |
| 10'/360° F. | 102 (4) | 53 (1) | 142 (5) |
| *Rubber coverage in parenthesis, evaluated on a scale of 1 to 5. | | | |
| Dynamic Flex, ¾" spindle, RT, 2.5 hr | | | |
| PTP Adhesion, N | | | |
| Unflexed | 139 | 84 | 138 |
| Flexed | 96 | 71 | 69 |
| % Ret. Tensile | 95 | 68 | 76 |
| Stiffness, mg/end | 175 | 203 | 354 |

For polyester applications using 4% solid oxazoline WS-500 as subcoat, the experimental gives higher static adhesion; lower dynamic flex adhesion and much higher stiffness for dipped cords.

EXAMPLE 2

This example compares volatile organic chemical (VOC) free oxazoline polymer (WS-700), together with WS-500 on aramid as a subcoat.

This example shows that both WS-700 and WS-500 oxazoline polymers, as diluted, can be used as epoxy-alternative subcoats for aramid. Both 2% and 1% solid level were investigated. Aramid cord was also dipped with water as subcoat to demonstrate the benefit of oxazoline polymer as subcoat.

Preparation of Adhesive Dips:

Control adhesive for aramid is a 1% aqueous dispersion of EPR as subcoat with an RFL dip as topcoat. Experimental adhesives include WS-700 and WS-500 oxazoline polymer at specified solid level as subcoat keeping the topcoat the same. In addition, aramid cord dipped with topcoat alone is used to confirm the effect of oxazoline subcoat.

Processing conditions for aramid cord are shown in Table 3.

TABLE 3

Litzler Conditions for Aramid Cord

| | First Pass | | | |
|---|---|---|---|---|
| Oven | E-Zone 1 | (Water) 2 | F-Zone 1 | (Subcoat) 2 |
| Temp (F.) | 280 | 280 | 280 | 480 |
| Time (sec) | 60 | 60 | 60 | 60 |

| | Second Pass | | | |
|---|---|---|---|---|
| Oven | E-Zone 1 | (Topcoat) 2 | F-Zone 1 | (Topcoat) 2 |
| Temp (F.) | 280 | 480 | 280 | 480 |
| Time (sec) | 60 | 60 | 60 | 60 |

Test Compounds:

Dipped aramid cords were tested in three compounds:

PTB (Passenger Tire Belt)

ATP (Radial Aircraft Tire Ply)

HPTB (High Performance Tire Belt)

Evaluation of oxazoline polymers as subcoat for aramid cords was carried out using both 2% solid level and 1% solid level for comparison. In one test, an epoxy subcoat was used as control. In another test a water subcoat was used to verify the contribution of oxazoline polymer as subcoat. Test results are summarized in Tables 4 and 5.

Overall test data showed that either WS-500 or WS-700 oxazoline polymer can be used as alternative subcoat for aramid cord. It is possible that oxazoline polymer is physically bound to an aramid surface through penetration, and then chemically reacts with phenolic components in RF resin as illustrated.

Reaction of Oxazoline with Phenol

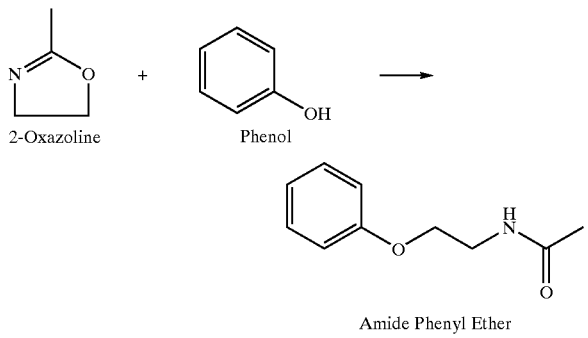

TABLE 4

Oxazoline Polymers for Aramid Application
Cord: DuPont Aramid   Control: EPR as subcoat
1100 dtex/2, 9 × 9 tpi   Expt. 1: 2% WS-500 as subcoat
                        Expt. 2: 1% WS-500 as subcoat

|  | Test 1% EPR Control | 2% WS-500 Expt. 1 | 1% WS-500 Expt. 2 |
|---|---|---|---|
| Static Adh., N (Test @ 250 F.) | | | |
| PTB, 14'/310 F. | 130 (5) | 136 (5) | 141 (5) |
| ATP, 14'/310 F. | 184 (3) | 179 (3) | 172 (3) |
| HPTB, 14'/310 F. | 93 (5) | 97 (5) | 96 (5) |
| *Rubber Coverage (0 to 5) | | | |
| Dyn Flex, 12'/340 F., 1" spd, 170 F., 2.5 hr | | | |
| PTB Adhesion, N | | | |
| Unflexed | 126 | 135 | 131 |
| Flexed | 127 | 133 | 114 |
| % Ret. Tensile | 44 | 43 | 43 |
| ATP Adhesion, N | | | |
| Unflexed | 177 | 179 | 203 |
| Flexed | 172 | 182 | 196 |
| % Ret. Tensile | 47 | 48 | 46 |
| HPTB Adhesion, N | | | |
| Unflexed | 87 | 83 | 75 |
| Flexed | 79 | 77 | 70 |
| % Ret. Tensile | 44 | 50 | 52 |
| Pull out Adhesion, J | | | |
| HPTB | 1.26 (4) | — | — |
| Rubber coverage (0 to 5) | | | |
| Stiffness, mg/end | 27 | 32 | 21 |

TABLE 5

Cord: DuPont Aramid   Expt. 3: 2% WS-700 as subcoat
1100 dtex/2, 9 × 9 tpi   Expt. 4: 1% WS-700 as subcoat
                        Expt. 5: Water as subcoat

|  | Test 2% WS-700 Expt. 3 | 1% WS-700 Expt. 4 | Water Expt. 5 |
|---|---|---|---|
| Static Adh., N (Test @ 250 F.) | | | |
| PTB, 14'/310 F. | 141 (5) | 127 (5) | 118 (3) |
| ATP, 14'/310 F. | 175 (3) | 177 (3) | 149 (0) |
| HPTB, 14'/310 F. | 95 (5) | 91 (5) | 71 (2) |
| *Rubber Coverage (0 to 5) | | | |
| Dyn Flex, 12'/340F, 1" spd, 170 F., 2.5 hr | | | |
| PTB Adhesion, N | | | |
| Unflexed | 125 | 115 | 112 |
| Flexed | 118 | 112 | 99 |
| % Ret. Tensile | 49 | 53 | 61 |
| ATP Adhesion, N | | | |
| Unflexed | 175 | 177 | 171 |
| Flexed | 170 | 184 | 169 |
| % Ret. Tensile | 45 | 39 | 48 |
| HPTB Adhesion, N | | | |
| Unflexed | 83 | 89 | 82 |
| Flexed | 79 | 81 | 76 |
| % Ret. Tensile | 45 | 40 | 42 |
| Pull out Adhesion, J | | | |
| HPTB | 1.68 (4) | — | 1.14 (0) |
| *Rubber coverage (0 to 5) | | | |
| Stiffness, mg/end | 29 | 27 | 28 |

Dipped cord stiffness of all experimental samples were similar to the control.

Static peel adhesion test results in all three compounds showed that when WS-500 or WS-700 was used as subcoat, equal adhesion compared to epoxy subcoat control was achieved. The adhesion performance seems to be better with 2% solid level than with 1% solid level. The cord dipped with water gave the worst adhesion with lower rubber coverage.

A pull out adhesion test was also used for comparison. Three samples were selected and tested at 250° F. (121° C.) for pull out adhesion in HPTB compound. Test results show that the cord dipped with only topcoat was bare while the control and 2% WS-700 subcoat samples had lots of rubber adhered. The highest energy was for the cord dipped with 2% WS-700 subcoat.

Dynamic flex adhesion test results also showed that when WS-500 or WS-700 was used as subcoat, equal flexed adhesion was achieved in all three compounds. Dipped cord retained tensiles after flex were all comparable.

EXAMPLE 3

This example compares the performance of WS-700 to WS-500 as a polyester subcoat. Polyester cord was also dipped with water as subcoat in order to verify the benefit of oxazoline polymer as subcoat.

Preparation of Adhesive Dips:

Control adhesive for polyester is EMRFL. Experimental adhesives include WS-700 and WS-500 oxazoline polymer at 4% solid level with and without vinylpyridine SBR latex as subcoat, followed by an RFL dip as topcoat. In addition, polyester cord dipped with topcoat alone is used to demonstrate the effect of oxazoline subcoat.

Standard Litzler polyester cord processing conditions were used.

Test Compounds:

Dipped Polyester Cords Were Tested in the Following Compounds:

PTP (Passenger and Light Truck Tire)
RMTB (Radial Medium Truck Belt)

Evaluation of oxazoline polymers as subcoat for polyester cords was carried out using 4% solid level. Both WS-500 and WS-700 were also blended with vinylpyridine SBR latex separately for evaluation. Standard polyester adhesive EMRFL was used as control. Water subcoat was used to verify the contribution of oxazoline polymer as subcoat. Test results are summarized in Tables 6 and 7.

TABLE 6

Oxazoline Polymers for Polyester Application
Cord: Allied Polyester 1 × 50   Control: EMRFL
1100 dtex/3, 8.5 × 8.5 tpi   Expt. 1: 4% WS-700 as subcoat
                              Expt. 2: 4% WS-700 & PSBR as subcoat

| Test | EMRFL Control | 4% WS-700 Expt. 1 | WS-700 & PSBR Expt. 2 |
|---|---|---|---|
| Static Adh., N (Test @ 250 F.) | | | |
| PTP, 13'/340 F. | 102 (5) | 113 (5) | 124 (5) |
| PTP, 10'/360 F. | 78 (4) | 99 (4) | 101 (5) |
| RMTB, 14'/310 F. | 106 (5) | 124 (5) | 134 (5) |
| *Rubber Coverage (0 to 5) | | | |
| Dyn Flex, 12'/340 F., ¾" spd, RT, 2.5 hr | | | |
| PTP Adhesion, N | | | |
| Unflexed | 91 | 119 | 117 |
| Flexed | 86 | 118 | 108 |
| % Ret. Tensile | 87 | 75 | 81 |
| RMTB Adhesion, N | | | |
| Unflexed | 114 | 119 | 109 |
| Flexed | 92 | 109 | 97 |
| % Ret. Tensile | 70 | 64 | 64 |
| Stiffness, mg/end | 232 | 425 | 305 |

TABLE 7

Cord: Allied Polyester 1 × 50   Expt. 3: 4% WS-500 as subcoat
1100 dtex/3, 8.5 × 8.5 tpi   Expt. 4: 4% WS-500 & PSBR as subcoat
                              Expt. 5: Water as subcoat

| Test | 4% WS-500 Expt.3 | WS-500 & PSBR Expt. 4 | Water Expt. 5 |
|---|---|---|---|
| Static Adh., N (Test @ 250 F.) | | | |
| PTP, 13'/340 F. | 133 (5) | 128 (5) | 52 (0) |
| PTP, 10'/360 F. | 100 (5) | 102 (5) | 52 (0) |
| RMTB, 141/310 F. | 69 (1) | 82 (2) | 53 (0) |
| *Rubber Coverage (0 to 5) | | | |
| Dyn Flex, 12'/340 F., ¾" spd, RT, 2.5 hr | | | |
| PTP Adhesion, N | | | |
| Unflexed | 125 | 116 | — |
| Flexed | 116 | 100 | — |
| % Ret. Tensile | 67 | 72 | — |
| RMTB Adhesion, N | | | |
| Unflexed | 98 | 115 | — |
| Flexed | 83 | 99 | — |
| % Ret. Tensile | 69 | 65 | — |
| Stiffness, mg/end | 402 | 344 | 294 |

Cords dipped with oxazoline polymer showed much higher stiffness than the control. Blending with latex reduced dipped cord stiffness.

Static adhesion test results in PTP compound showed that when WS-500 or WS-700 was used as subcoat, equal or better adhesion compared to the control was achieved. As in RMTB compound, WS-700 gave better adhesion than the control and much better adhesion than the WS-500 subcoat. Blending oxazoline polymer with latex showed increased adhesion.

Dynamic flex adhesion results trended similar to the static peel adhesion results.

Overall test data showed that WS-700 oxazoline polymers can provide very good adhesion for polyester. They can be used at 4% solid level to achieve the same or better adhesion level as the control.

EXAMPLE 4

Epoxy resin subcoat used currently for bonding aramid to rubber demonstrates good adhesion sufficient to cause rubber tear in many compounds tested.

Oxazoline polymer as an alternative subcoat for aramid fibers proved to provide adhesion comparable to epoxy subcoat.

EXPERIMENTAL:

Cords were prepared as in Example 2.

Dipped aramid cords were tested in passenger tire belt, high performance tire belt and radial aircraft ply compounds for static adhesion.

Conditions were more severe than in Example 2 to demonstrate utility in more severe tire applications.

Test results are summarized in Table 8.

TABLE 8

Oxazoline Polymers for Aramid Application
Cord: DuPont Aramid
1100 dtex/2, 9 × 9 tpi

| Test | 2% WS-500 | 2% WS-700 | Water | EPR control |
|---|---|---|---|---|
| Static Adh., N (Test @ 250 F.) | | | | |
| PTB, 14'/310 F. | 159 (5) | 172 (5) | — | 163 (5) |
| ATP, 14'/310 F. | 160 (3) | 171 (3) | — | 170 (3) |
| HPTB, 14'/310 F. | 149 (5) | 155 (5) | 99 (1) | 149 (5) |
| HPTB, 22'/310 F. | 124 (5) | 125 (5) | 93 (1) | 118 (5) |
| HPTB, 22'/310 F. (test @ 350 F.) | 98 (5) | 96 (5) | 90 (1) | 98 (5) |
| *Rubber Coverage (0 to 5) | | | | |
| Dyn Flex, 12'/340 F. 1" spd, 170 F., 2.5 hr | | | | |
| HPTB Adhesion, N | | | | |
| Unflexed | 103 | 104 | — | 111 |
| Flexed | 97 | 98 | — | 100 |
| % Ret. Tensile | 52 | 56 | — | 49 |
| Pull out Adhesion, J | | | | |
| HPTB | 2.51 (3) | 2.43 (4) | 2.08 (0) | 2.71 (4) |

*Rubber coverage (0 to 5)

RESULTS AND DISCUSSIONS:

Static peel adhesion test results in all three compounds showed that when WS-500 or WS-700 was used as subcoat, equal adhesion compared to the epoxy subcoat control was achieved. The cord dipped with water gave extremely low adhesion with much lower rubber coverage.

Dynamic flex adhesion test results also showed that when WS-500 or WS-700 was used as subcoat, equal flexed adhesion was achieved. Dipped cord retained tensiles after flex were all comparable.

Overall test data showed that either WS-500 or WS-700 oxazoline polymer can be used as alternative subcoat for aramid cord.

What is claimed is:

1. A process for adhering synthetic textile fibers to sulfur vulcanizable rubbers comprising the steps of (I) immersing said fibers in an aqueous solution of 1% to 4% solids oxazoline polymer, 0% to 4% alkylene glycol monoether, and 92% to 99% water, wherein e represents percent by weight, to produce coated fibers; (II) drying said coated fibers to produce subcoated fibers; (III) subjecting the subcoated fibers to an RFL adhesive dip to produce dipped fibers; (IV) drying the dipped fibers to produce dried dipped fibers; (V) placing the dried dipped fibers in contact with a sulfur vulcanizable rubber; and (VI) curing the sulfur vulcanizable rubber while it is in contact with said dried dipped fibers.

2. A composite article of rubber and fibers, made according to claim 1.

3. A composite article of rubber and fibers as specified in claim 2 wherein said fibers are polyester fibers.

4. A composite article of rubber and fibers as specified in claim 2 wherein said fibers are aramid fibers.

5. The process of claim 1 wherein the aqueous solution comprises 2 percent oxazoline polymer and 98 percent water.

6. The composite article of claim 2 which is a tire.

* * * * *